United States Patent [19]

Rogers

[11] Patent Number: 5,125,565
[45] Date of Patent: Jun. 30, 1992

[54] TRIANGULAR CARTON

[75] Inventor: Eugene J. Rogers, Pickering, Canada

[73] Assignee: G. H. Holdings Inc., Ontario, Canada

[21] Appl. No.: 764,707

[22] Filed: Sep. 24, 1991

[51] Int. Cl.[5] .............................. B65D 5/10; B65D 5/60
[52] U.S. Cl. .................................... 229/115; 229/149; 229/150; 220/403
[58] Field of Search ........................ 229/115, 149, 150; 220/403, 410

[56] References Cited

U.S. PATENT DOCUMENTS

| | | |
|---|---|---|
| 443,397 | 12/1890 | Mack ................................. 229/115 |
| 1,758,585 | 5/1930 | Riegel ............................... 229/115 |
| 2,003,600 | 6/1935 | Lowenfels ........................ 229/115 |
| 2,334,997 | 11/1943 | Doll ................................. 229/115 |
| 2,807,403 | 9/1957 | Joseph ............................. 229/115 |
| 2,935,192 | 5/1960 | Million-Czarnecki .............. 229/115 |
| 3,101,839 | 8/1963 | Holman ............................ 220/403 |
| 3,185,378 | 5/1965 | Rosenburg, Jr. .................. 229/150 |
| 3,295,740 | 1/1967 | Hall ................................. 229/115 |
| 3,756,497 | 9/1973 | Stewart ............................ 229/115 |

FOREIGN PATENT DOCUMENTS

| | | | |
|---|---|---|---|
| 1297307 | 5/1962 | France ................................. 229/115 |
| 1445636 | 6/1966 | France ................................. 229/115 |
| 1519472 | 4/1968 | France ................................. 229/115 |
| 1338230 | 11/1973 | United Kingdom ................ 229/115 |

Primary Examiner—Gary E. Elkins
Attorney, Agent, or Firm—Whitham & Marhoefer

[57] ABSTRACT

A triangular carton is made from biodegradable paperboard or cardboard material and is particularly suitable for flowable building materials. It has a rectangular rear panel and a pair of rectangular front panels as well as a triangular top panel and a triangular bottom. The carton can be folded from a one-piece blank provided with suitable flaps and tabs which serve to releasably interlock the various panels in the assembled state of the carton. The triangular carton lends itself to efficient stacking on shelves as well as to creative displays and unique advertising graphics. Its shape also allows the direct utilization of a roller for the application of material therefrom without requiring that the material be poured into an intermediate trough or tray. If an impervious liner is used the carton can be kept clean and disposed of in normal landfill.

15 Claims, 5 Drawing Sheets

TRIANGULAR CARTON

This invention relates to cartons for the packaging of flowable building materials and to the blanks from which such cartons may be formed.

BACKGROUND OF THE INVENTION

Typically, flowable building materials such as paint or premixed stucco or drywall joint compound are sold in cans or pails, although drywall joint compound has been sold in cubic cartons with a plastic liner or a waterproof coating therein. The cans or pails as previously utilized are an environmental problem when it comes to disposal, as are coated or treated cardboard cartons. They are not biodegradable. Furthermore, with previously used pails, cans or cartons the tradesman must pour or otherwise transfer the contents thereof into a tray, trough or other container for application to a wall or other surface, especially when the applicator is a roller or other such device. Cylindrical pails or cans, when displayed on a store shelf, do not permit maximum utilization of such space, in view of the shape thereof.

SUMMARY OF THE INVENTION

The carton of the present invention overcomes the problems of prior art pails, cans or cartons used for flowable building materials. The carton of the present invention has the configuration, in plan, of a triangle, particularly an isosceles triangle. It is from a one-piece blank of cardboard or paperboard which can be folded into the desired configuration prior to filling with the building material. The cardboard is not treated in any particular way and therefore it is biodegradable or posssibly recyclable, the adhesives used in producing the cardboard being water soluble and biodegradable in their own right.

The triangular carton of this ivention has advantages from the standpoint of utility and marketing. Its triangular shape is unique in the industry and it provides three large surfaces for the printing of product identification information. When viewed straight-on one will see two sides, more than what one would normally see when viewing a cylindrical pail or a rectangular carton. This allows a graphic artist to more boldly or expressively present graphic material that would be attractive to the consumer. Innovative displays can be created using the carton to attract the consumer.

In use, a plastic liner would be introduced into the carton before filling with the flowable material. The top of the carton will have a handle cut-out to aid in opening the carton and, once open, the upper part of the liner can be folded over the edges of the carton to keep them clean, important if the carton is to be recycled or placed in landfill with the expectation of decay over the years. The shape of the carton is such that a tradesman can insert a roller directly into the carton for the ready application of the material to the appropriate surface, without having to move material from the carton to an intermediate container prior to application thereof.

The blank for the carton includes interenagageable flaps, tabs and slots which, as the blank is formed, create a strong, reasonably rigid carton. The top portion contains the cut-out acting as a handle for carrying purposes. The blank can be die-cut from stock cardboard or paperboard in standard equipment in a standard manner.

In summary therefore the present invention may be considered as providing a triangular carton comprising: a generally rectangular rear panel and a pair of generally rectangular front panels defining an apex therebetween and each meeting a respective end of the rear panel at an acute angle, each front panel being hingedly connected to the rear panel and including first means connecting the front panels together at the apex; a top generally triangular panel hingedly connected to the rear panel; second means releasably interlocking the top panel with the front panels; and a generally triangular bottom formed from three interlocking bottom flaps with each of said rear and front panels having a respective bottom flap hingedly connected thereto.

Furthermore, the invention may be considered as providing a blank for forming into a triangular carton, comprising: a generally rectangular rear panel having opposed upper and lower long edges and a pair of opposed short end edges; a pair of generally rectangular front panels, each hingedly connected to a corresponding one of the rear panel short end edges; a generally triangular top panel hingedly connected to the rear panel upper long edge; a pair of first flaps hingedly connected to the top panel; a pair of second generally triangular flaps, each hingedly connected to an upper edge of a respective front panel; third, fourth and fifth generally triangular bottom flaps hingedly connected to the lower edge of the rear and front panels respectively, each of said bottom flaps having a generally semi-circular tab extending from one side edge thereof; and a generally rectangular flap hingedly connected to one of said front panels along a free end edge thereof.

The invention will be described in greater detail hereinafter with reference to the drawings.

DESCRIPTION OF THE PREFERRED EMBODIMENT

Figure 1:
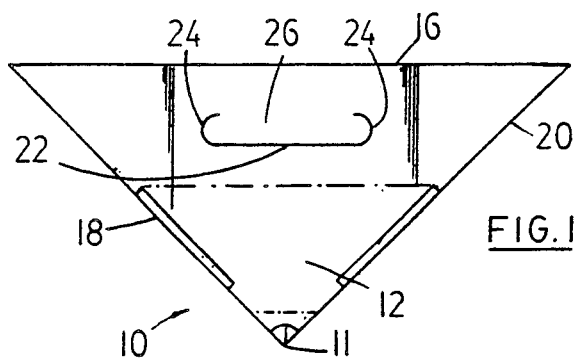
FIGS. 1 to 5 show, respectively, top plan, front left, front right, bottom plan, and rear views of the triangular carton of this invention.
Figure 2:
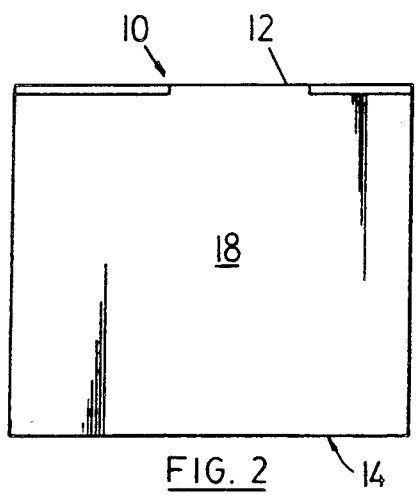
Figure 3:
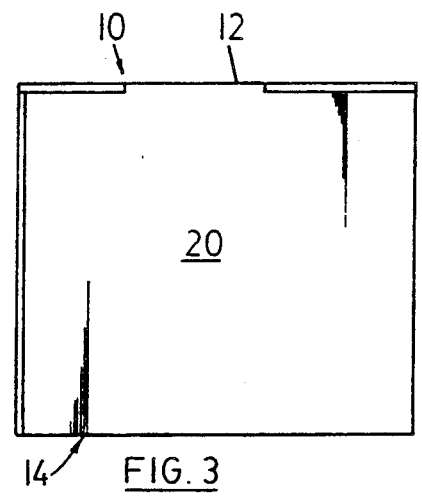
Figure 4:
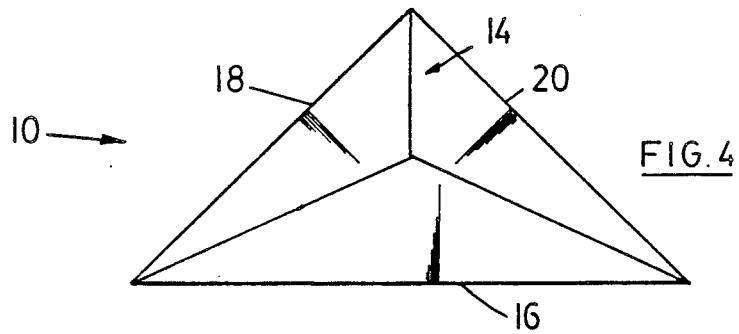
Figure 5:
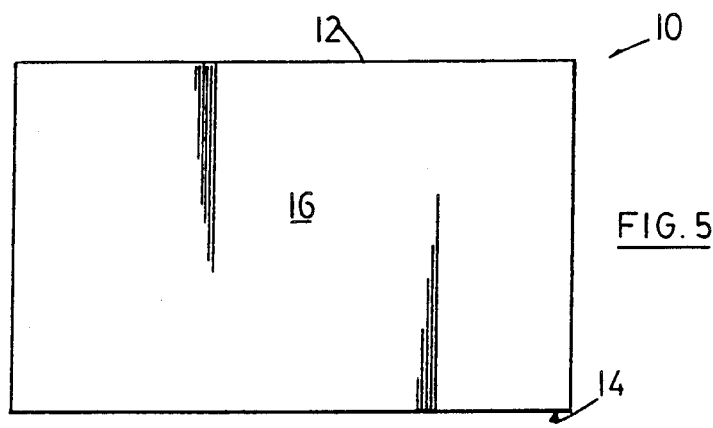

FIGS. 1 to 6 show the triangular carton 10 of the present invention. It includes a triangular top panel 12, a triangular bottom 14, a rectangular rear panel 16, and front left and front right rectangular panels 18 and 20. The top, front left and front right panels are hingedly connected to the rear panel 16 and are folded about the hinge connections to the configuration shown in FIG. 6. The front panels meet at an apex 11 and meet the rear panel at an acute angle. Details relating to the shape, orientation and construction relating to the panels are deferred to the discussion of the blank, to be presented hereinafter.

The top panel 12 has a straight slit portion 22 therethrough, which portion has a re-entrant arcuate portion 24 at each end thereof. The slit portions 22, 24 defines a generally obround portion 26 which is normaly coplanar with the top panel 12. The obround portion can be pushed into the carton to create an obround opening which, in conjunction with the surrounding top material, provides a handle by which the carton 10 can be carried.

Figure 7:
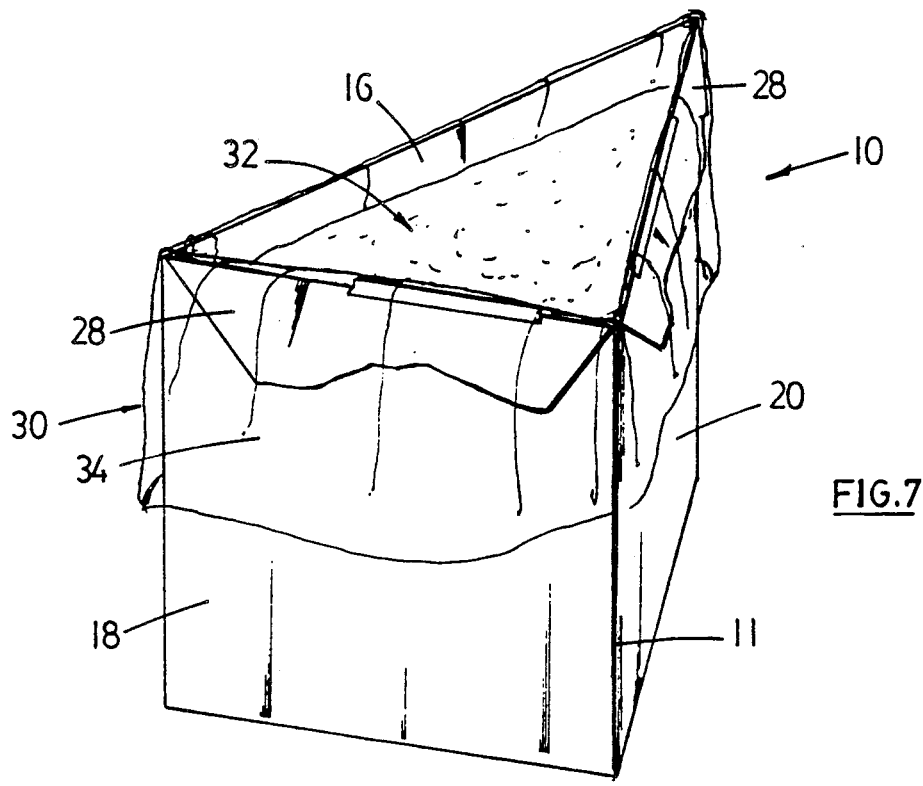
FIG. 7 shows a perspective view of an open carton as it might be used.

With reference to FIG. 7 it is seen that in its open configuration the top panel 12 been folded back as have the generally triangular internal top flaps 28 along the upper edge of each panel 18, 20. An impervious liner 30 within the carton contains flowable material, such as joint compound 32, and as seen, the upper part 34 of the liner has been folded over the upper parts of the carton 10 to protect them from material 32 which could otherwise contaminate the material of the carton 10 and render it non-biodegradable or non-recyclable. The shape of the carton 10 also makes it easy for a person to insert an elongate roller directly into the carton adjacent the rear wall 16 so as to immerse the roller in the material 32, making it unnecessary to transfer material 32 to an intermediate container such as a tray or trough.

Figure 9:
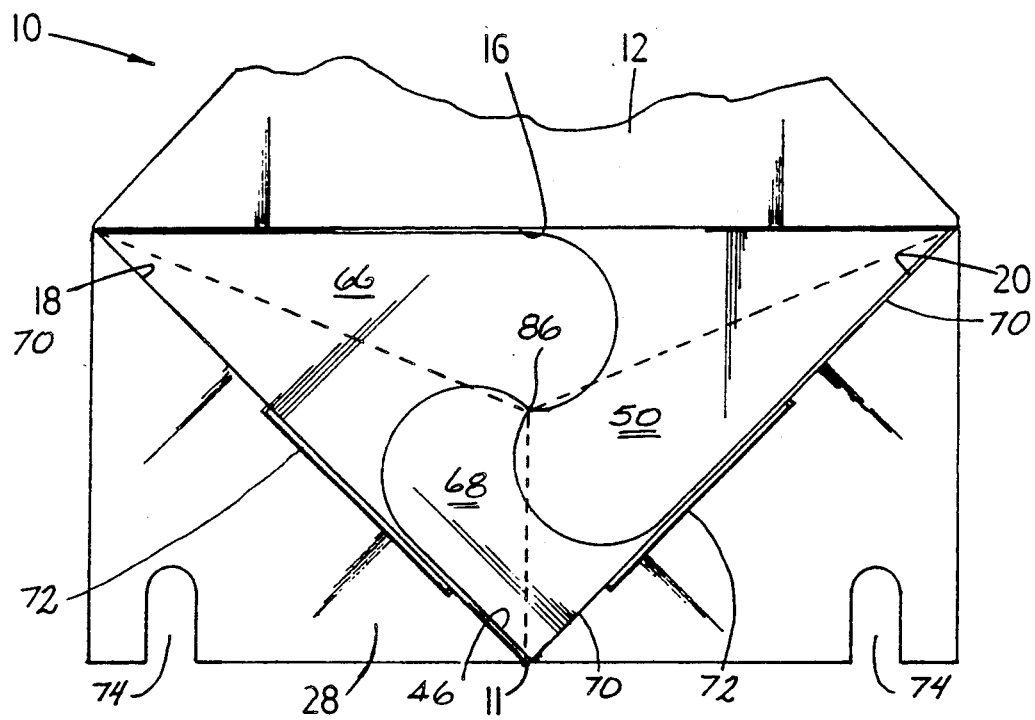
FIG. 9 shows a plan view of the carton with the top open, showing the arrangement of flaps.
Figure 8:
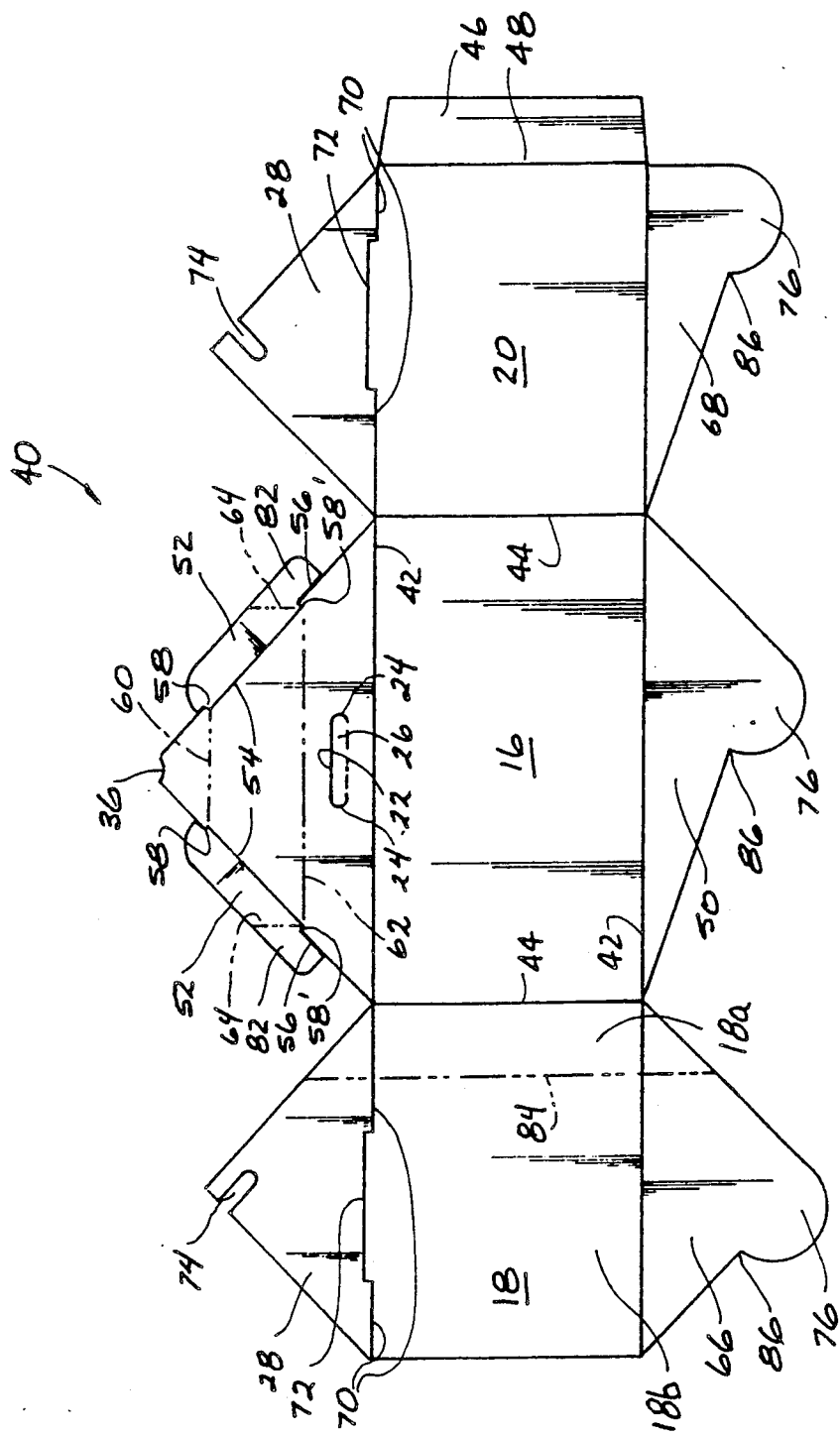
FIG. 8 shows a plan view of a blank used for the carton of this invention.

FIG. 8 shows the blank 40 used to form the carton 10 and FIG. 9 shows a plan view of an open carton illustrating the relative positioning of the various flaps and tabs in the formed carton.

With particular reference to FIG. 8 it is seen that in the flat configuration of the blank 40 all of the components are based on the rear panel 16. The rear panel has opposed long edges 42 and opposed short edges 44. One of the front panels 18 is hingedly connected to the rear panel 16 along one short edge 44, the hinge connection deining a fold line. Similarly, the other front panel 20 is hingedly connected to the rear panel 16 along the other short edge 44, that hinge connection defining a fold line as well. The panel 20 is provided with a generally rectangular end flap 46 hingedly connected thereto along fold line 48.

Triangular top panel 12 is hingedly connected to the rear panel 16 along its upper long edge 42 while a generally triangular bottom flap 50 is hingedly connected to the rear panel 16 along its lower long edge 42. The top panel 12 has a pair of first rectangular flaps 52 hingedly connected to the respective side edges thereof along fold line 54. A short slit 56 separates each flap 52 from the panel 12 of the inner end of the flap. Also, the fold line 54 is established slightly inwardly of the side edge of panel 12, there being short slits 58, 58' entending into the panel 12 to define the ends of the fold line. Additional fold lines 60, 62 extend across the panel 12 and fold line 64 extends across each flap 52 normal to fold line 62 at each end thereof. A curved cut 36 at the apex of the panel 12 serves as a finger gripping zone. The slits 22, 24, 24 are cut through the top panel 12 to define the obround handle portion 26.

There is hingedly connected to the upper long edge of each panel 18, 20 a second generally triangular flap 28, and there is hingedly connected to the lower long edge of the panels 18, 20 fourth and fifth generally triangular bottom flaps 66, 68 respectively. Each flap 28 is connected to its panel along spaced apart fold lines 70, 70 separated by elongated shallow U-shaped cut-out 72. Also, each flap 28 has a U-shaped cut-out 74 extending inwardly from one edge, near the free apex thereof, which cut-out will underly a portion of the handle portion 26 in the top panel 12.

Each bottom flap 50, 66, 68 has a generally semi-circular tab 76 extending from one edge thereof near the free apex of the flap, the tabs all pointing in generally the same direction. The arcuate edge of each tab 76 starts as an extension of one edgre of its flap and then arcuately returns to meet the converging edge of the flap, defining a sharp inside corner 86 therewith. It will be noted that each of the flaps 50, 66, 68 has a different triangular configuration, flap 66 being generally isosceles in configuration, flap 50 being generally scalene and flap 68 being generally scalene right in configuration. The dimensions for the bottom flaps will of course depend on the size of the carton and in particular on the length of the rear and front panels.

Figure 6:
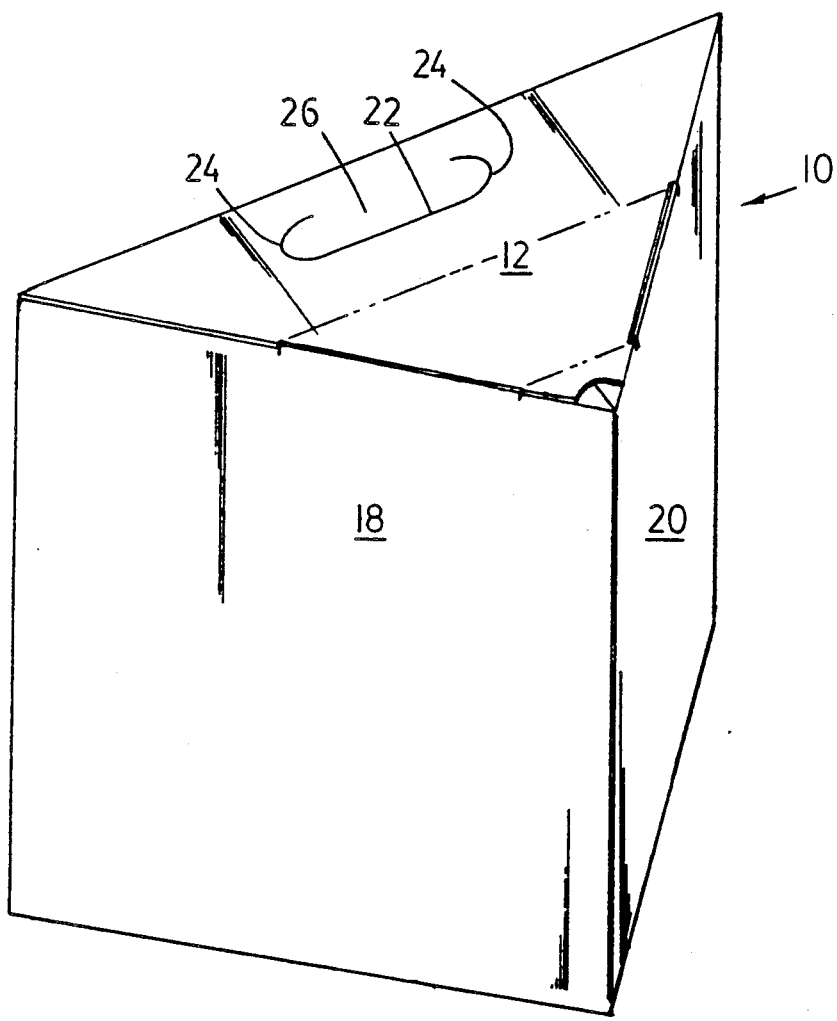
FIG. 6 shows a perspective view of a closed carton.

Turning now to FIGS. 6 and 9 the manner in which the various flaps and tabs interlock to create a relatively rigid triangular carton will now be described.

In FIG. 9 one is looking into the carton 10 from the top, with the top panel 12 folded rearwardly and the upper flaps 28 folded outwardly. The panels 16, 18 and 20 are shown defining the triangular configuration of the carton and the bottom flaps 50, 66, 68 are also seen therein. In assembling the carton one first of all folds the front or side panels 18,20 about the fold lines 44 and then one folds the flap 46 about the fold line 48, adhering the flap 46 to the inside surface of the panel 18 with a suitable adhesive, thereby defining the apex 11.

Having defined the triangular configuration of the carton one then folds each of the bottom flaps 50, 66, 68 inwardly about its hinge connection to its respective panel. The flaps 50, 66, 68 will overlap each other, without interlocking, when each is roughly perpendicular to its panel. However, if the flaps are pushed simultaneously into the interior of the carton they will separate, each from the others, with the respective tabs 76 being adjacent each other. The flaps are released and are allowed to pivot back towards the exterior of the carton. As they pivot back the three tabs 76 will interlock with each other at the shape inside corners thereof, with the tab 76 of flap 66 overlying the flap 50, the tab 76 of flap 50 overlying flap 68 and the tab 76 of flap 68 overlying flap 66. This makes for a strong, easily assembled bottom configuration, suitable for the purposes for which the carton is intended.

Figure 10:
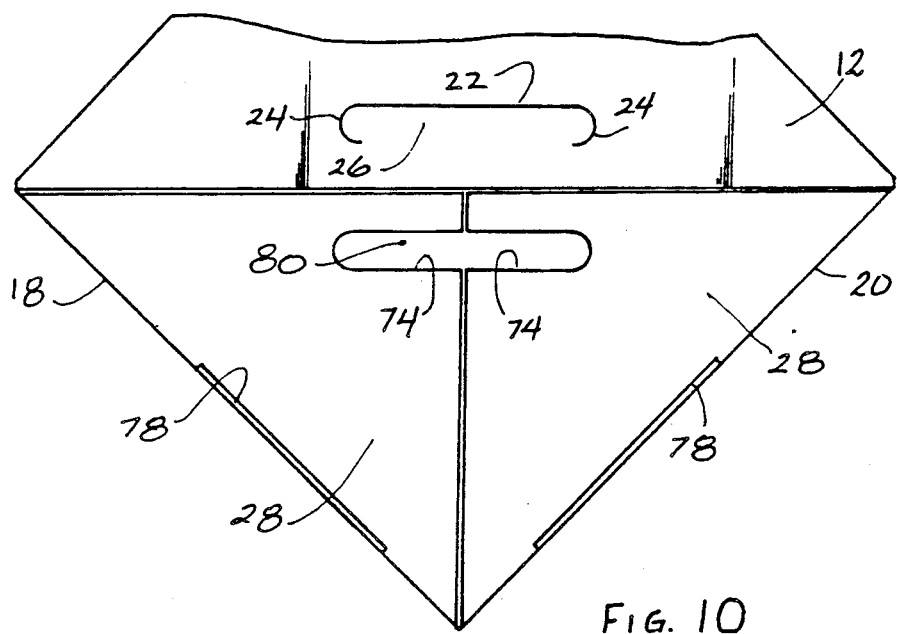
FIG. 10 shows another plan view with the top panel open and the top flaps in a closed condition.

In order to close in the carton the triangular flaps 28 are folded inwardly about their fold lines to the position seen in FIG. 10. There it is seen that the U-shaped cut-outs 72 now define elongated slots 78 adjacent the front panels 18, 20. The slots are about as long as the fold lines 54 between the flaps 52 and the top panel 12. With the triangular flaps 28 folded inwardly it is seen that the U-shaped cut-outs 74 now define a generally obround opening 80.

Next the top panel 12 is folded about the fold line 62 and the flaps 52 are folded inwardly about the fold lines 54. Also, each flap is folded on the fold line 64 so that the free portion 82 of each flap 52 can be inserted straight downwardly into a respective slot 78. When the main (rear) part of top panel 12 is resting on the flaps 28 the forward part can be folded downwardly and forwardly so that the rest of each flap 52 will pivot into its slot 78, the final configuration being shown in FIG. 6. In this configuration the handle portion 26 will overly the opening 80 so that it can be pressed into the carton for creation of the carrying handle.

When the carton is to be opened one can grasp the top panel at the finger receiving recess 36 at the apex and bend that portion of the top panel upwards about the fold line 60. This creates a small tab which can be easily grasped and pulled, causing the forward part of the panel 12 to bend on the line 62 and the flaps 52 to exit the slots 78, essentially reversing the closing process.

When the top panel is closed the free portion 82 of each flap 52 will underly the adjacent flap 28 thereby locking the top panel in place and making it very difficult to inadvertently open the carton if it is turned upside down while full.

Complete assembly of the carton can be performed by the end user, in which case the blanks will be sent directly to the end user in a flat configuration as shown in FIG. 8. Alternatively, and preferably, the initial step of adhering the flap 46 to the panel 18 is performed by the blank manufacturer to simplify and speed up the assembly process by the end user. Once the flap has been adhered to the panel 18 one is left with a triangular subassembly, open at top and bottom. Then one can flatten the panel 20 against the rear panel 16, causing the other panel 18 to fold about the vertical fold line 84 seen in FIG. 8. When this happens the result is a flat, folded blank of double thickness, one layer being the rear panel 16 and the adjacent portion 18a of the panel 18 and the other layer being the panel 20 and the portion 18b of the panel 18. This flat folded blank is easily shipped and stored and it can be readily opened by the end user and then assembled into a carton as described.

The triangular configuration of the carton lends itself to creative graphics and packaging displays to attract the consumer. If the same information is printed on each panel 16, 18, 20 the cartons can be placed on a shelf in a very compact and space-efficient manner. The cartons can be stacked one above the other or in a matrix, with a large total surface area of advertising or consumer information exposed to the customer. The material of the carton is biodegradable and if it is not contaminated by product during use it can be recycled or sent to landfill sites without fear of further damaging the environment. The carton can be produced on standard equipment at little expense and it can be produced in a wide variety of sizes and proportions. Also, although it was designed to accommodate flowable building materials it could be used to package almost anything, from laundry detergent to toys.

A preferred embodiment of the present invention has been disclosed herein, but it is clear that changes therein or modifications thereto may occur to a skilled individual in the art without departing from the spirit of the invention. Thus the protection to be afforded this invention is to be determined from the scope of the claims appended hereto.

I claim:

1. A blank for forming into a triangular carton, comprising: a generally rectangular rear panel having opposed upper and lower long edges and a pair of opposed short end edges; a pair of generally rectangular front panels, each hingedly connected to a corresponding one of said rear panel short end edges; a generally triangular top panel hingedly connected to said rear panel upper long edge; a pair of first flaps hingedly connected to said top panel; a pair of second, generally triangular, flaps, each hingedly connected to an upper edge of a front panel; third, fourth, and fifth generally triangular bottom flaps hingedly connected to the lower edge of the rear and front panels respectively, each of said bottom flaps having a generally semi-circular tab extending from one side edge thereof; and a generally rectangular flap hingedly connected to one of said front panels along a free end edge thereof.

2. The blank of claim 1 including an elongated U-shaped cut-line along the hinge connection between the respective triangular flap and said front panel whereby when each triangular flap is folded about its hinge connection the U-shaped cut-line therein defines a slot in the triangular flap into which a folded corresponding one of said first flaps may be inserted.

3. The blank of claim 2 including a slit along a portion of the hinge connection between each of said first flaps and said triangular panel, a first fold line extending across sasid top panel between inner ends of said slits, and a second fold line in each said first flap extending perpendicular to said first fold line.

4. The blank of claim 3 including a handle-defining slit through said triangular top panel, said slip including a straight portion with a re-entrant arcuate portion at each end of said straight portion.

5. The blank of claim 4 wherein each of said second, triangular, flaps includes a U-shaped cut-out therein providing clearance for said handle one said blank has been folded and assembled to create said triangular carton.

6. The blank of claim 3 including an arcuate cut-out portion at an apex of said triangular top panel and a third fold line extending across said top panel adjacent said cut-out portion.

7. The blank of claim 3 wherein said third bottom flap is hingedly connected to said rear panel and has a generally scalene configuration, said fourth bottom flap is hingedly connected to one of said front panels and is generally isosceles in configuration, and said fifth bottom flap is hingedly connected to the other of said front panels and is generally scalene right in configuration.

8. The blank of claim 7 wherein said semi-circular tabs all extend in generally the same direction.

9. The blank of claim 8 wherein an arcuate edge of each semi-circular tab starts as an extension of one edge of its bottom flap and then arcuately returns to meet the adjacent converging edge of the bottom flap, defining a sharp inside corner therewith.

10. The blank of claim 1 wherein the material of said blank is biodegradable.

11. A triangular carton comprising: a generally rectangular rear panel and a pair of generally rectangular front panels defining an apex therebetween and each meeting a respective end of said rear panel at an acute angle, each front panel being hingedly connected to said rear panel; a rectangular flap hingedly connected to one of said front panels at a free edge thereof for adhesive connection to the other of said front panels adjacent the free edge thereof; a top generally triangular panel hingedly connected to said rear panel; a pair of first generally rectangular flaps, each hingedly connected to said top panel along a respective edge thereof, there being a short slit between each first flap and the top panel adjacent one end of the first flap; a pair of second generally triangular flaps, each hingedly connected to an upper edge of a respective front panel and defining a slot therein when the second flap is folded about its hinge connection, each first flap being received in a corresponding one of said slots; and a generally triangular bottom formed from three interlocking bottom flaps with each of said rear and front panels having a bottom flap hingedly connected thereto.

12. The carton of claim 11 wherein each of said bottom flaps is generally triangular in configuration and has a generally semi-circular tab extending from one edge thereof adjacent a free apex thereof, said bottom flaps closing the bottom of said carton with the tabs thereof overlapping and interlocking with each other in the interior of said carton.

13. The carton of claim 12 including a slit in said top panel defining a generally elongated handle portion, ssaid slit having a straight portion and a re-entrant arcuate portion at each end of said straight portion.

14. The carton of claim 11 including an impervious liner in said carton for containing flowable material, said liner having upper side portions foldable over said top panel and said second triangular flaps when opened and folded away from the interior of said carton.

15. The carton of claim 11 wherein the material of said carton is biodegradable.

* * * * *